United States Patent [19]
Dobbins

[11] 3,815,527
[45] June 11, 1974

[54] ROLLER, HOPPER, SCATTER SHIELD AND BRAKE ASSEMBLY FOR PRECISION SEEDING

[76] Inventor: John B. Dobbins, 9371 E. Chapman Ave., Garden Grove, Calif. 92641

[22] Filed: Sept. 5, 1972

[21] Appl. No.: 286,295

[52] U.S. Cl.................................. 111/11, 222/561
[51] Int. Cl............................................... A01c 7/08
[58] Field of Search........ 111/10, 11; 222/561, 235; 122/180, 193, 194, 198

[56] References Cited
UNITED STATES PATENTS

| | | | |
|---|---|---|---|
| 147,874 | 2/1874 | Smith | 111/11 |
| 352,158 | 11/1886 | Snyder, Jr. | 222/561 X |
| 410,873 | 9/1889 | Butler | 111/10 |
| 571,827 | 11/1896 | Burdge | 111/11 |
| 2,730,054 | 1/1956 | McDonald | 111/10 |

Primary Examiner—Stephen C. Pellegrino
Attorney, Agent, or Firm—Raymond L. Madsen

[57] ABSTRACT

A hopper for dispensing seed is connected to a roller for rolling and smoothly packing finely cultivated soil. A deflector plate having a step thereon is attached to the hopper for intercepting and scattering the seed dispensed from the hopper onto the back surface of the roller where the seed is further scattered uniformly over the roller and smoothly packed soil. A rake having flexible tines is adjustably connected to the hopper and roller assembly to gently scratch the top surface of the rolled and smoothly packed seeded soil thereby securing the seed therein.

9 Claims, 4 Drawing Figures

ROLLER, HOPPER, SCATTER SHIELD AND BRAKE ASSEMBLY FOR PRECISION SEEDING

The present invention relates to planting and seeding apparatus and more particularly to a roller, hopper, scatter shield and rake assembly for uniformly seeding finely cultivated and precisely graded soil and for securing the seed therein.

In the field of seeding and planting, it has been the general practice to employ soil cultivating devices in combination with seed dispensing apparatus followed by seed covering devices. Although such devices and apparatus have served the purpose, they have not proved entirely satisfactory under all conditions of service for the reasons that considerable difficulty has been experienced in applying such devices and apparatus to the seeding of finely cultivated and precisely graded soil and difficulties encountered in obtaining a uniform and even distribution of seed over the soil surface.

In the field of precision seeding, it has been the general practice to roll and drill, cultipac, or broadcast seed, resulting in either rows of planted seed with spaces therebetween or in overlapping seeding with waste of seed and with varying densities of seeds in the planted areas. Those concerned with the development of precision seeders have long recognized the need for seeding devices which will spread seed over the soil surface in an even and uniform manner without overlapping seeded areas thereby making it possible to use less seed. The present invention fulfills this need.

One of the most critical problems confronting designers of precision seeders for finely cultivated and precisely graded soil has been the retention of seed on the surface thereof against wind and water erosion without disturbing the rolled and smoothly packed surface of the soil and without burying the seed at depths where it will not germinate. This problem is overcome by the present invention.

The present invention further combines the operations of rolling, precision seeding and a fine rake all in one apparatus assembly which performs precision seeding in a uniform and controlled manner in one operation heretofore not possible with existing assemblies.

The general purpose of this invention is to provide a precision seeding apparatus which embraces all the advantages of similarly employed seeders and possesses none of the aforedescribed disadvantages. To obtain this, the present invention contemplates a unique arrangement of a roller, hopper, seed deflector plate, and rake assembly whereby finely cultivated and graded soil can be evenly and uniformly seeded and whereby the seed is retained at the soil surface without disturbing or destroying the prepared characteristics of the soil.

An object of the present invention is the provision of simultaneously rolling finely cultivated and graded soil, uniformly seeding the rolled and smoothly packed surface, and lightly scratching the rolled and uniformly seeded soil surface to secure the seed therein.

Another object of the invention is the provision of uniformly seeding rolled and smoothly packed soil by dispensing seed from a hopper onto a deflector plate and from the deflector plate onto the back surface of a roller where it is scattered evenly over the surface of the rolled soil.

A further object of the invention is the provision of simultaneously rolling finely cultivated soil, dispensing seed from a hopper onto a deflector plate, scattering seeds from the deflector plate onto the back surface of the roller, and further scattering the seed from the back surface of the roller uniformly over the rolled and smoothly packed surface of the soil following the roller and lightly raking the seeded, rolled and smoothly packed soil to secure the seed at the surface thereon.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
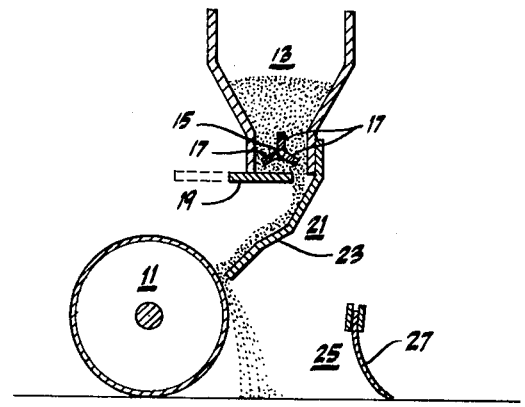
FIG. 1 illustrates a cross-sectional view of the principal elements of the present invention and their relative positions.

Turning now to FIG. 1, there is illustrated an elongated cylindrical body member or roller 11 having a smooth circumferential surface and innershaft. Normally, the roller rotates in the counterclockwise direction indicated by the arrow. Hopper 13 is located above and to the rear of the roller relative to the normal direction of travel. Hopper 13 has a large rectangular opening into which seed is inserted and a small rectangular opening from which seed is dispensed. Located within the small rectangular opening is shaft 15 with paddles 17 mounted thereon. Opening control or cover 19 is adjustably mounted to cover the small rectangular opening of hopper 13. Deflector plate or scatter shield 21 is connected adjacent to one edge of the small rectangular opening of hopper 13 and extends thereunder. Deflector plate 21 has step 23 centrally located thereon parallel to the small rectangular opening of hopper 13. Just behind and below hopper 13 is located rake assembly 25 having flexible rake tines 27.

Figure 2:
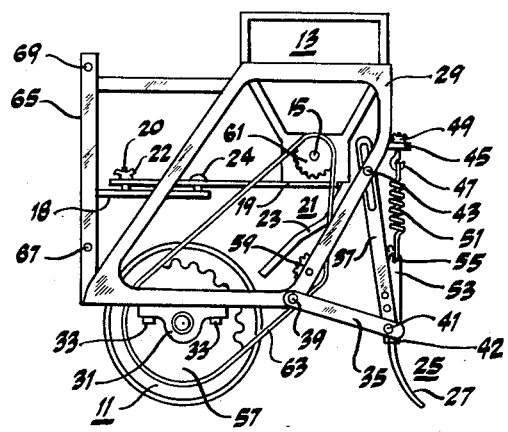
FIG. 2 illustrates a side view of a preferred embodiment of the present invention.

FIG. 2 illustrates a side view of a preferred embodiment of the invention showing the interconnected assembly and physical relationship of roller 11, hopper 13 and rake assembly 25. Frame 29 is attached to hopper 13. Roller 11 has the axle thereof held in bearing 31 which in turn is attached to frame 29 by bolts 33. Support arm 35 is pivotally attached to frame 29 by pin 39. Sliding arm 37 has a slot in one end through which pin 43 slideably attaches sliding arm 37 to frame 29. Sliding arm 37 has a multiplicity of holes in the other end through which pin 41 selectively may be inserted. Pin 41 is further inserted through a hole in the free end of arm 35. Pin 41 is securely attached to the end of bar 42 of rake assembly 25. Bracket 45 is attached to frame 29 and has a hole therethrough to receive hook 47. Hook 47 has one end threaded to receive wingnut 49 whereby hook 47 may be adjustably secured to bracket 45. Bias member spring 51 engages the hook of hook 47 and is further connected to spring arm 53 through hole 55 therein. The other end of spring arm 53 is fixedly secured to the end of bar 42. It is to be noted that the above description applies to both sides of the assembly, the other side being the mirror image of the elements described above.

Standard 3 point triangular hitch 65 is attached to frame 29. Hitch 65 has a pair of openings 67, one of which can be seen in FIG. 2 on one leg of the hitch, the other leg being obscured, and opening 69 at the apex or junction of the legs of the hitch. Also attached to hitch 65 is bracket 18 to which opening control or cover 19 is adjustably attached by standoff 24 and bolt and spacer 20 with wingnut 22 engaging the threaded bolt.

Gear 57 is fixedly attached to the axle of roller 11 and has chain 63 engaging the teeth thereof. Chain 63 further engages idle gear 59 which is rotatably attached to frame 29 and gear 61 which is fixedly attached to shaft 15 which passes through the small rectangular opening of hopper 13.

Figure 3:
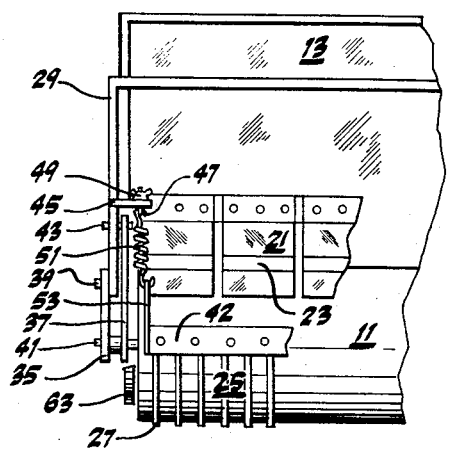
FIG. 3 is a cut-away portion of the rear view of the embodiment of FIG. 2.

FIG. 3 illustrates a cut-away section of the rear view of the preferred embodiment of FIG. 2. Hopper 13 is attached to frame 29 and further has attached thereto scatter shield 21 having two flat surfaces separated by a third flat segment or step 23. Although the scatter shield 21 could be a thin body member in the form of one continuous plate, the preferred embodiment illustrated shows a multiplicity of scatter shields or panels connected side by side, the separating edges thereof being perpendicular to the juncture of the step surface and the two flat surfaces. It is to be noted that any number of individual scatter shields may be utilized, the multiplicity of small shields being more easily constructed than one large shield of unitized construction.

FIG. 3 further illustrates the construction of rake assembly 25. Tines 27 are secured in bar 42 which in turn is connected to one end of spring arm 53. Pin 41 is attached to bar 42 and passes through one end of sliding arm 37 and support arm 35 and allows bar 42 with tines 27 to rotate freely.

Figure 4:
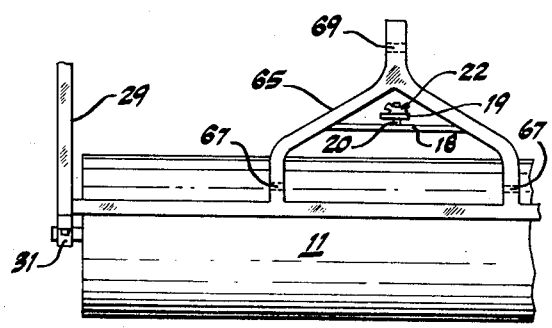
FIG. 4 shows a cut-away portion of the front view of the embodiment of FIG. 2.

FIG. 4 is a cut-away portion of the front view of the preferred embodiment of FIG. 2 and illustrates the construction of hitch 65. Frame 29 has standard 3 point hitch 65 attached thereto with the pair of holes 67 at the base of each leg and the single hole 69 located at the apex or juncture of the legs.

Operation of the invention can best be described by turning to FIGS. 1 and 2. Seeds are loaded into the interior of hopper 13 through the large rectangular opening in the top thereof. A tractor or other vehicle is attached to the 3 point hitch by placing pins or bolts through holes 67 and 69 to secure the hitch to a mating assembly mounted on the tractor. As the assembly is pulled over the ground, roller 11 rotates causing gear 57 to rotate and to move chain 63 which in turn rotates gear 61 attached to shaft 15. Idle gear 59 is used to adjust the tension of chain 63. As shaft 15 rotates, paddles 17 attached thereto agitate the seed in the smaller rectangular opening in hopper 13 so that it is dispensed therefrom. Cover 19 is adjusted by loosening wingnut 22 and moving cover 19 to adjust the opening in hopper 13 thereby controlling the amount of seed dispensed by rotating paddles 17. As the seeds fall from the smaller rectangular opening in hopper 13, they strike scatter shield or deflector plate 21 and slide down the surface thereof to further traverse step 23. When the seeds strike step 23 they are scattered outwardly away from deflector plate 21 and onto the back surface of roller 11. The seeds in turn bounce off the back surface of roller 11 and finally onto the smoothly packed and rolled soil following roller 11. This multiple scattering action caused by the seeds striking the deflector plate and then the step in the deflector plate and finally the back surface of the roller results in a uniform and even distribution of seeds over the area behind roller 11. As a result, less seed can be used to insure coverage since seed is uniformly scattered over the rolled and smoothly packed surface. As the assembly moves, tines 27 of rake assembly 25 are adjusted to just touch the smoothly rolled and packed surface of the soil and lightly scratch the soil's surface. Wingnut 49 adjusts the tension on spring 51 so that the tines 27 of rake assembly 25 are biased to just touch the surface of the soil. Support arm 35 pivots about pin 39 and sliding arm 37 slides on pin 43 to allow the rake assembly to follow the contours of the soil surface, the motion rake assembly being limited by the length of the slot in arm 37. It should be understood that although a rigid sliding arm and spring are illustrated, it is possible to use a flexible chain connection instead in place of sliding arm 37 with similar results. The tines are inclined away from the direction of motion to insure a light raking action and to prevent the tines from digging into the soil and collecting debris. If the assembly is moved in the reverse direction, the rake assembly can rotate about pin 41 so that tines 27 will not be damaged or dig into the soil. The rake tines 27 are closely spaced so that the light raking action will secure substantially all the seeds which have been uniformly spread over the rolled surface preceding the rake assembly 25. By the light raking action of the tines, the seeds are lightly covered with a thin layer of soil or held in place by the scratches produced in the rolled soil surface by the tips of the rake tines 27. This prevents the seeds from being blown away by the wind or washed away by water used to irrigate the seeded soil.

It should be apparent that the present invention provides a mechanical arrangement of a roller, hopper, scatter shield, and rake assembly which may be employed in conjunction with a tractor for uniformly seeding finely cultivated and precisely graded soil surfaces. Although particular components, etc., have been discussed in connection with a specific embodiment of apparatus constructed in accordance with the teachings of the present invention, others may be utilized. Furthermore, it will be understood that although an exemplary embodiment of the present invention has been disclosed and discussed, other applications and mechanical arrangements are possible and that the embodiments disclosed may be subjected to various changes, modifications and substitutions without necessarily departing from the spirit of the invention.

What is claimed is:

1. Precision planting apparatus comprising:
   a roller for rolling and smoothly packing soil which has been finely cultivated for seeding, the surface of said roller opposite the direction of motion being designated as the back surface;
   a hopper connected to said roller for containing and dispensing seed for planting, said hopper having walls which form a container, said container having a large opening into which the seed is inserted and a small opening from which seed is dispensed, said small opening having an agitator therein for activating the dispensing of seed and an opening control for adjusting the size of said small opening to control the amount of seed dispensed therefrom;

a deflector attached to said hopper for scattering the dispensed seed onto the back surface of said roller, said back surface further scattering the seed uniformly over the rolled and smoothly packed soil; and a rake having an elongated member, a pair of support arms, and a pair of sliding arms, said elongated member having flexible tines attached thereto, one arm of said pair of support arms being rotatably attached to each end of said elongated member and pivotally attached to the assembly of said roller and said hopper, each arm of said pair of sliding arms having one end slidably connected to said assembly of said roller and said hopper and the other end respectively connected to an end of said elongated member, whereby said pair of sliding arms limits the motion of said rake and said elongated member rotates to point said tines opposite from the direction of motion such that such tines gently scratch the top surface of the rolled and smoothly packed soil, thereby securing the seed therein.

2. The precision planting apparatus described in claim 1 wherein said rake includes bias means for holding said rakes tines in light contact with the contour of the rolled, smoothly packed and seeded soil surface.

3. The precision planting apparatus described in claim 1 wherein said sliding arms are replaced by flexible chains.

4. The precision planting apparatus described in claim 1 wherein said deflector comprises a thin body member having at least two flat surfaces thereon joined by a third flat segment forming a step therebetween, said thin body member being connected to said hopper adjacent said small rectangular opening whereby seed dispensed therefrom slides along the one flat surface to strike said step thereby scattering the seeds outwardly toward said back surface of said roller.

5. The precision planting apparatus described in claim 2 wherein said bias means comprises:

a pair of brackets attached to said assembly of said container and cylindrical base member;

a pair of hooks, one end of each hook being adjustably attached to only one of said pair of brackets, respectively;

a pair of springs, one end of each spring being attached to the other end of only one of said pair of hooks, respectively; and a pair of spring arms, one end of each being fixedly attached to only one end of said elongated member, respectively, the other end of each spring arm being connected to the other end of only one of said pair of springs, respectively, whereby said pair of hooks may be adjusted to provide tension on said pair of springs which in turn is transmitted through said pair of spring arms to said elongated member to bias said rake to lightly touch the surface of the soil.

6. The precision planting apparatus described in claim 5 further including a three-point hitch mounting assembly attached to said assembly of said container and said cylindrical base member whereby said assembly may be attached by said three-point hitch to a tractor.

7. The precision planting apparatus described in claim 4 wherein said thin body member is separated into a multiplicity of substantially similar panels having the dividing edges thereof substantially perpendicular to the edges formed by the juncture of said step surface and said at least two flat surfaces.

8. The precision planting apparatus described in claim 6 further including a chain drive mechanism comprising:

a first gear connected to one end of said cylindrical base member;

a second gear attached to said agitator means; and a chain drive means connected between said first and second gears.

9. The precision planting apparatus described in claim 6 wherein said agitator means for activating the dispensing of seed from said small rectangular opening in said container comprises:

a shaft rotatably mounted interior to said small rectangular opening; and paddle means attached to said shaft, said paddle means rotating as said shaft rotates to activate the dispensing of seed from said small rectangular opening in said container.

* * * * *